US011167967B2

(12) United States Patent
Hoffman

(10) Patent No.: US 11,167,967 B2
(45) Date of Patent: Nov. 9, 2021

(54) ENHANCED TRACTION CONTROL FOR INDUSTRIAL VEHICLE

(71) Applicant: Hyster-Yale Group, Inc., Fairview, OR (US)

(72) Inventor: Matthew K. Hoffman, Greenville, NC (US)

(73) Assignee: HYSTER-YALE GROUP, INC., Fairview, OR (US)

( * ) Notice: Subject to any disclaimer, the term of this patent is extended or adjusted under 35 U.S.C. 154(b) by 217 days.

(21) Appl. No.: 15/795,616

(22) Filed: Oct. 27, 2017

(65) Prior Publication Data

US 2018/0118543 A1 May 3, 2018

Related U.S. Application Data

(60) Provisional application No. 62/415,231, filed on Oct. 31, 2016.

(51) Int. Cl.

| | |
|---|---|
| ***G06F 7/70*** | (2006.01) |
| ***G06G 7/76*** | (2006.01) |
| ***G06G 7/00*** | (2006.01) |
| ***B66F 9/075*** | (2006.01) |
| ***B66F 9/24*** | (2006.01) |
| ***B66F 9/065*** | (2006.01) |
| *G05D 1/00* | (2006.01) |
| *G05D 3/00* | (2006.01) |
| *G06F 17/00* | (2019.01) |
| *A01B 69/00* | (2006.01) |
| *B62D 6/00* | (2006.01) |

(Continued)

(52) U.S. Cl.

CPC .......... *B66F 9/07572* (2013.01); *B66F 9/065* (2013.01); *B66F 9/07504* (2013.01); *B66F 9/24* (2013.01)

(58) Field of Classification Search

CPC ........ B66F 9/07572; B66F 9/065; B66F 9/22; B66F 9/07504; B66F 9/07509; G06F 7/00; B62D 51/04; B62D 2009/007666

USPC ................. 701/50, 2, 41, 70; 180/19.1, 65.1

See application file for complete search history.

(56) References Cited

U.S. PATENT DOCUMENTS 6,464,025 B1 * 10/2002 Koeper .................... B62B 5/06 180/19.2

9,718,661 B1 8/2017 Hoffman (Continued)

FOREIGN PATENT DOCUMENTS

DE 69209433 T2 10/1992

OTHER PUBLICATIONS

IP.com Search.*

*Primary Examiner* — Mahmoud S Ismail

(74) *Attorney, Agent, or Firm* — Schwabe Williamson & Wyatt

(57) ABSTRACT

A traction control system for a pallet truck includes a traction motor, an operator controlled input device configured to selectively accelerate the pallet truck in both a forward direction of vehicle travel and a reverse direction of vehicle travel, and an operator controlled actuation device configured to place the pallet truck in an auxiliary mode of operation. A vehicle controller may monitor a speed of the pallet truck and, in response to receiving an actuation signal, command the traction motor to maintain the speed of the pallet truck at an intermediate rate of travel without actuation of the operator controlled input device.

22 Claims, 7 Drawing Sheets

(51) Int. Cl.

| | |
|---|---|
| *B62D 11/00* | (2006.01) |
| *B62D 12/00* | (2006.01) |
| *B63G 8/20* | (2006.01) |
| *B63H 25/04* | (2006.01) |

(56) References Cited

U.S. PATENT DOCUMENTS

| | | | | | |
|---|---|---|---|---|---|
| 2004/0099453 | A1* | 5/2004 | Guy | B62D 51/04 | 180/65.1 |
| 2007/0137904 | A1* | 6/2007 | Rose | B62B 3/0612 | 180/19.1 |
| 2009/0076664 | A1* | 3/2009 | McCabe | B60L 3/02 | 701/2 |
| 2013/0153840 | A1* | 6/2013 | Feiquan | B66F 9/065 | 254/2 R |
| 2013/0197760 | A1* | 8/2013 | Castaneda | B66F 9/07581 | 701/41 |
| 2014/0303867 | A1* | 10/2014 | Dunigan | B62B 5/0414 | 701/70 |

* cited by examiner

ENHANCED TRACTION CONTROL FOR INDUSTRIAL VEHICLE

RELATED APPLICATIONS

This application claims priority to U.S. provisional application No. 62/415,231, entitled "ENHANCED TRACTION CONTROL FOR INDUSTRIAL VEHICLE" and filed on Oct. 31, 2016, the contents of which is incorporated herein by reference.

TECHNICAL FIELD

This application relates to the field of industrial powered vehicles configured to transport goods and materials.

BACKGROUND

Industrial vehicles by design may be used for a wide range of uses, duty cycles, and applications. In some operating conditions, industrial vehicles may be infrequently used to transport materials only when needed, e.g., in response to the occasional received shipment of goods. In other types of operating conditions, industrial vehicles may be used nearly around the clock in multiple shifts, with the only substantial down-time occurring during routine or required maintenance.

Operators of pallet trucks and other types of industrial vehicles are many times paid on incentive, such that any feature that will simplify the operation of the truck or provide functionality that increases productivity may benefit not only the operators but also the associated businesses.

An industrial vehicle such as a pallet truck may be utilized to lift and transport loads between locations. The operator of the pallet truck may move loads repeatedly on and off of the pallet truck within a very short period of time, moving specific inventory from various locations in what is termed "picking." During this practice, the operator may leave the pallet truck and pick a load while the pallet truck continues to move in the direction of the next load.

To avoid inadvertent vehicle travel, pallet trucks may have a dead-man mechanism that engages a vehicle brake in the event that the operator leaves the pallet truck and releases the control arm.

While control handles may be designed with ergonomic principles in mind, during operation of the traction control an operator may be required to continuously press, toggle, hold, or otherwise actuate the traction control in order to maintain speed of the vehicle. The amount of effort that the operator applies to the traction control may be relatively low; however, repeated operation over the course of a work shift may result in a certain amount of operator fatigue.

Because the vehicle may work in a variety of different environments and applications during one or more shifts, what may be a preferred configuration in one mode of operation may instead be deemed to be less than optimal in another mode of operation. Some types of industrial vehicle settings may be modified by a manufacturer, dealer, or authorized maintenance personnel via a vehicle interface or a special service tool; however, operators are typically prohibited from changing vehicle operation settings during the work shift. Additionally, since the vehicle mode of operation may vary from one hour to the next, it may not be practical or particularly efficient to access the vehicle interface or use a service tool to change the settings of the vehicle during the work shift.

This application addresses these and other problems.

SUMMARY

A traction control system for a pallet truck is disclosed herein. The traction control system may comprise a traction motor, an operator controlled input device configured to selectively affect a speed of the pallet truck in both a forward direction of vehicle travel and a reverse direction of vehicle travel, and an operator controlled actuation device configured to place the pallet truck in an auxiliary mode of operation. A vehicle controller communicatively coupled to both the operator controlled input device and the operator controlled actuation device may be configured to monitor the speed of the pallet truck. The speed may comprise an operator-selectable intermediate rate of travel less than a maximum rate of vehicle travel associated with the auxiliary mode of operation. In response to receiving an actuation signal from the actuation device to place the pallet truck in the auxiliary mode of operation, the vehicle controller may command the traction motor to maintain the speed of the pallet truck at the intermediate rate of travel without actuation of the operator controlled input device.

A method of operating a traction control system is disclosed herein. The method may comprise monitoring a speed of the pallet truck. The speed may comprise an operator-selectable intermediate rate of travel less than a maximum rate of vehicle travel associated with the auxiliary mode of operation. Additionally, the method may comprise receiving an actuation signal from the actuation device to place the pallet truck in the auxiliary mode of operation, and commanding the traction motor to maintain the speed of the pallet truck at the intermediate rate of travel without actuation of the operator controlled input device.

DETAILED DESCRIPTION

Figure 1:
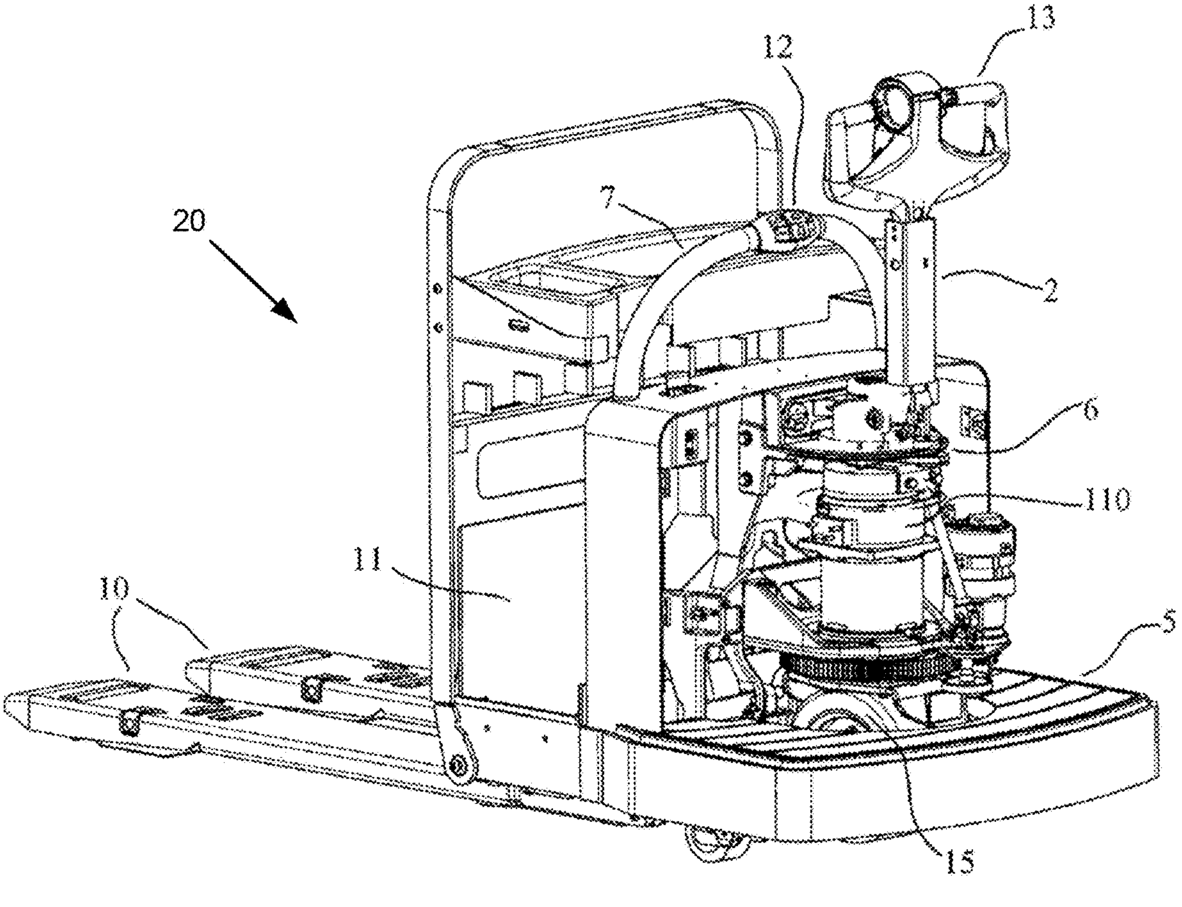
FIG. 1 illustrates a perspective view of an example pallet truck.

FIG. 1 illustrates a front right isometric view of an example pallet truck 20 with its cover removed. Pallet truck 20 may be referred to as a "rider" style pallet truck. The pallet truck 20 is moved by a traction motor 110 that is energized by a battery located in a battery compartment 11. A pair of forks 10 may be raised and lowered via a hydraulic cylinder. Pallet truck 20 may comprise a control handle 13 attached to a steering arm 2. The steering arm 2 may be attached to a steer control unit 6, which controls the direction of a drive wheel 15 located under the traction motor 110 and, therefore, controls the direction of travel of the pallet truck 20. Additionally, pallet truck 20 may comprise an electronic controller configured to communicate with one or more lift, lower and traction actuators.

Pallet truck 20 may include an operator platform 5 upon which the operator may stand on and operate the pallet truck 20. From the operator platform 5, the operator is able to reach the support bar 7 and control handle 13. The support bar 7 may comprise a control panel 12 located at an approximate mid-point of the support bar 7. Control panel 12 is shown in more detail in FIG. 4.

Figure 2:
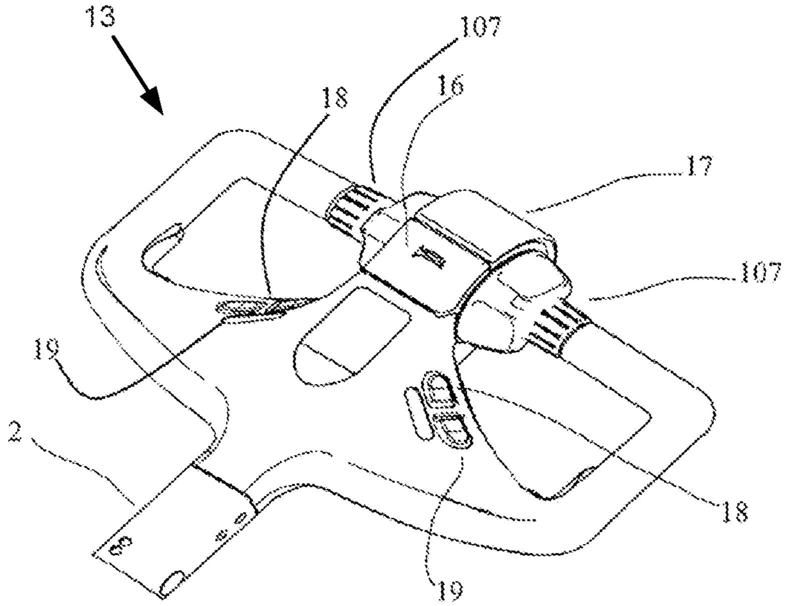
FIG. 2 illustrates an example control handle.

FIG. 2 illustrates the example control handle 13 of FIG. 1. The control handle 13 may comprise a horn button 16, an emergency reverse button 17, two lift buttons 18, and two lower buttons 19. The lift buttons 18 and lower buttons 19 lift and lower, respectively, the forks 11 upon which a load may be placed. Two sets of lift buttons 18 and lower buttons 19 are provided to facilitate operation by either a left or right handed operator. The emergency reverse button 17 reverses the direction of the traction motor 110 (FIG. 1).

The control handle 13 may comprise two symmetrically located variable throttles 107. When the operator is on the operator platform 5 or is walking alongside of the pallet truck 20, the operator may activate one of the throttles 107 with the same hand that is holding and controlling the control handle 13. The pallet truck 20 may be accelerated by traction motor 110 that may be operated in either the low speed travel mode or the high speed travel mode. In either low speed or high speed travel modes, the traction motor 110 may be actuated by means of one of the throttles 107. The rate of acceleration and maximum travel speeds obtained in the low and high speed travel modes may be determined according to the current limiting characteristics of the low and high speed travel circuits, respectively. For example, the low speed travel mode may provide for a maximum travel speed of approximately 3.5 miles per hour.

The control handle 130 may additionally comprise a horn button 16, an emergency reverse button 17, two lift buttons 18, and two lower buttons 19. The lift buttons 18 and lower buttons 19 may be configured to lift and lower, respectively, the forks upon which a load is placed. Two sets of lift buttons 18 and lower buttons 19 may be provided to facilitate operation by either a left or right handed operator. The emergency reverse button 17 may be configured to reverse the direction of the traction motor 110 (FIG. 1). The control handle 13 may be attached by means of a steering arm 2 to control the direction of a drive wheel, which may be located directly under the traction motor 110, and to control the direction of travel of the pallet truck, such as pallet truck 20 (FIG. 1).

Activation of the throttle 107 may cause the traction motor 110 to move in the forward or reverse direction depending on the command sent by the throttle 107 to the traction motor 110. Throttle 107 may comprise a butterfly type design, which may be rotated forward, away from the operator, to cause the pallet truck 20 to move in the reverse direction, or may be rotated backward, towards the operator, to cause the pallet truck 20 to move in the forward direction, similar to a conventional motorcycle throttle. Other types of throttle 107 may be used, such as twist grips, buttons, toggles, and pedals, without affecting the function of the present invention.

Figure 3:
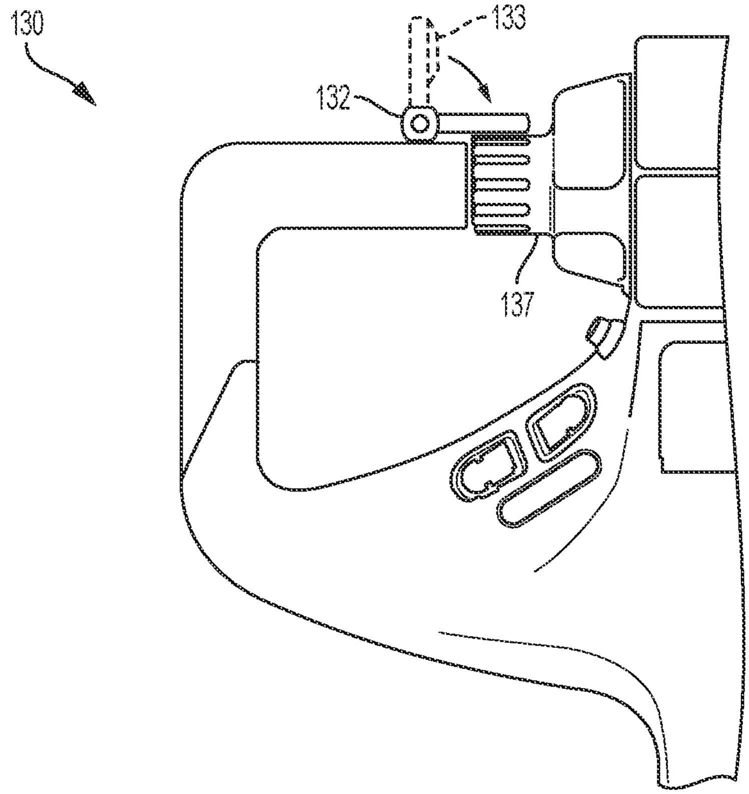
FIG. 3 illustrates an enlarged partial view of an example control handle.

FIG. 3 illustrates an enlarged partial view of an example control handle 30, which may be configured similarly to the control handle 13 of FIG. 2. The control handle 130 may comprise two symmetrically located primary throttles 137, similar to throttles 107 shown with respect to FIG. 2. When the operator is on the operator platform or is walking alongside of the pallet truck, the operator may activate one of the throttles 137 with the same hand that is holding and controlling the control handle 130.

Figure 4:
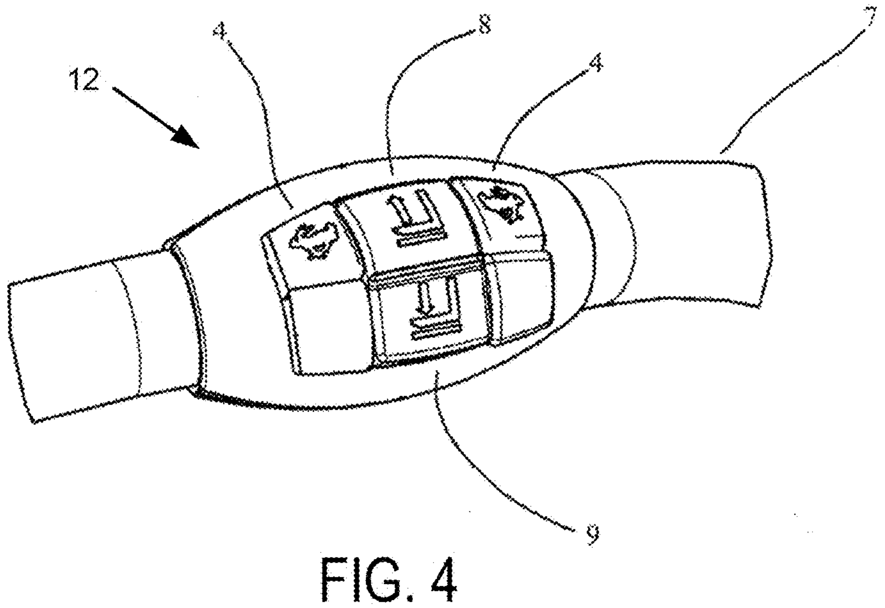
FIG. 4 illustrates an example control panel located on a support bar.

With the throttle 137 positioned in the forward or reverse direction, the operator may simultaneously or sequentially press a high speed actuation button, for example, high speed button 4 illustrated in FIG. 4. The operator may then continue to activate the throttle 137 in the high speed mode, whereby the pallet truck is able to travel at a higher maximum speed, for example when the operator needs to move a greater distance between picking loads. If the throttle 137 is released or placed in a neutral position, the pallet truck may be configured to coast to a stop.

In either low speed or high speed travel modes, the traction motor may be actuated by means of throttle 137. The rate of acceleration and maximum travel speeds obtained in the low and high speed travel modes may be determined according to the current limiting characteristics of the low and high speed travel circuits, respectively. For example, the low speed travel mode provides for a maximum travel speed of approximately 3.5 to 4.0 miles per hour. Activation of the throttle 137 may be configured to cause the traction motor to move in the forward or reverse direction depending on the command sent by the throttle 137 to the traction motor.

The throttle 137 may comprise a butterfly type design, which may be rotated forward, away from the operator, to cause the pallet truck to move in the reverse direction, or may be rotated backward, towards the operator, to cause the pallet truck to move in the forward direction, similar to a conventional motorcycle throttle. Other types of throttle 137 may be used, such as twist grips, buttons, toggles, and pedals.

A cruise control device 132 may be configured to lock the rotational position of throttle 137 in an operator selectable position. For example, cruise control device 132 may comprise a friction or stop mechanism 133, which maintains a fixed rotational position of throttle 137 such that the vehicle may be engaged in a cruise control mode of operation. In cruise control, the vehicle may continue to be accelerated or otherwise be maintained at a constant rate of travel.

In some examples, cruise control device 132 may be disabled when the vehicle is traveling in a forks-leading direction of vehicle travel. For example, cruise control device 132 may be configured to lock the rotational position of throttle 137 in a single direction of rotation associated with the forks-trailing direction of vehicle travel. An operator presence detection system may monitor for the presence of the operator. In some examples, the operator detection system may include an actuator (such as enhanced traction control actuator 225 (FIG. 6)), wherein the presence of the operator may be determined based on depression of the actuator. In some examples, the vehicle controller may be configured to disengage the cruise control when the operator leaves the vehicle (which may be determined based on the depression of the actuator) or when no operator input is received. Additionally, with the cruise control disabled, the vehicle controller may be configured to override the input of the throttle 137, which may be locked at some fixed rotational position by cruise control device 132, and initiate regenerative braking of the vehicle.

FIG. 4 illustrates an example control panel 12 located on a support bar 7. The control panel 12 may be equipped with an auxiliary lift button 8 and an auxiliary lower button 9, which function to lift and lower, respectively, the forks 10. By providing symmetric locations of the controls, the control panel may be more easily accessed from a left side or a right side, e.g., by a left-handed or a right-handed operator. Auxiliary lift button 8, and auxiliary lower button 9, may be understood to function the same as lift buttons 18, and lower buttons 19, respectively, of FIG. 3.

With the throttle 107, 137 (FIGS. 2 and 3) of the control handle positioned in the forward or reverse direction, the operator may simultaneously or sequentially press either of the two symmetrically located high speed buttons 4, located on the control panel 12. The operator may then continue to activate the throttle 107, 137 in the high speed mode, whereby the pallet truck 20 is able to travel at a higher maximum speed, for example when the operator needs to move a greater distance between picking loads. If the throttle 107, 137 is released or placed in a neutral position, the pallet truck 20 may be configured to coast to a stop, or may be braked depending on the position of the steer control handle. In some examples, subsequent activation of the throttle 107, 137 may cause the pallet truck to travel in the low speed mode until and unless the high speed button 4 is again activated.

During certain types of operation, the industrial vehicles may need to travel over a relatively long distance at full throttle. In known acceleration systems, the operator would typically need to hold the throttle at the desired position to achieve the corresponding travel speed. However, holding the throttle for an extended period of time can result in a certain amount of operator fatigue and create additional ergonomic challenges.

Figure 6:
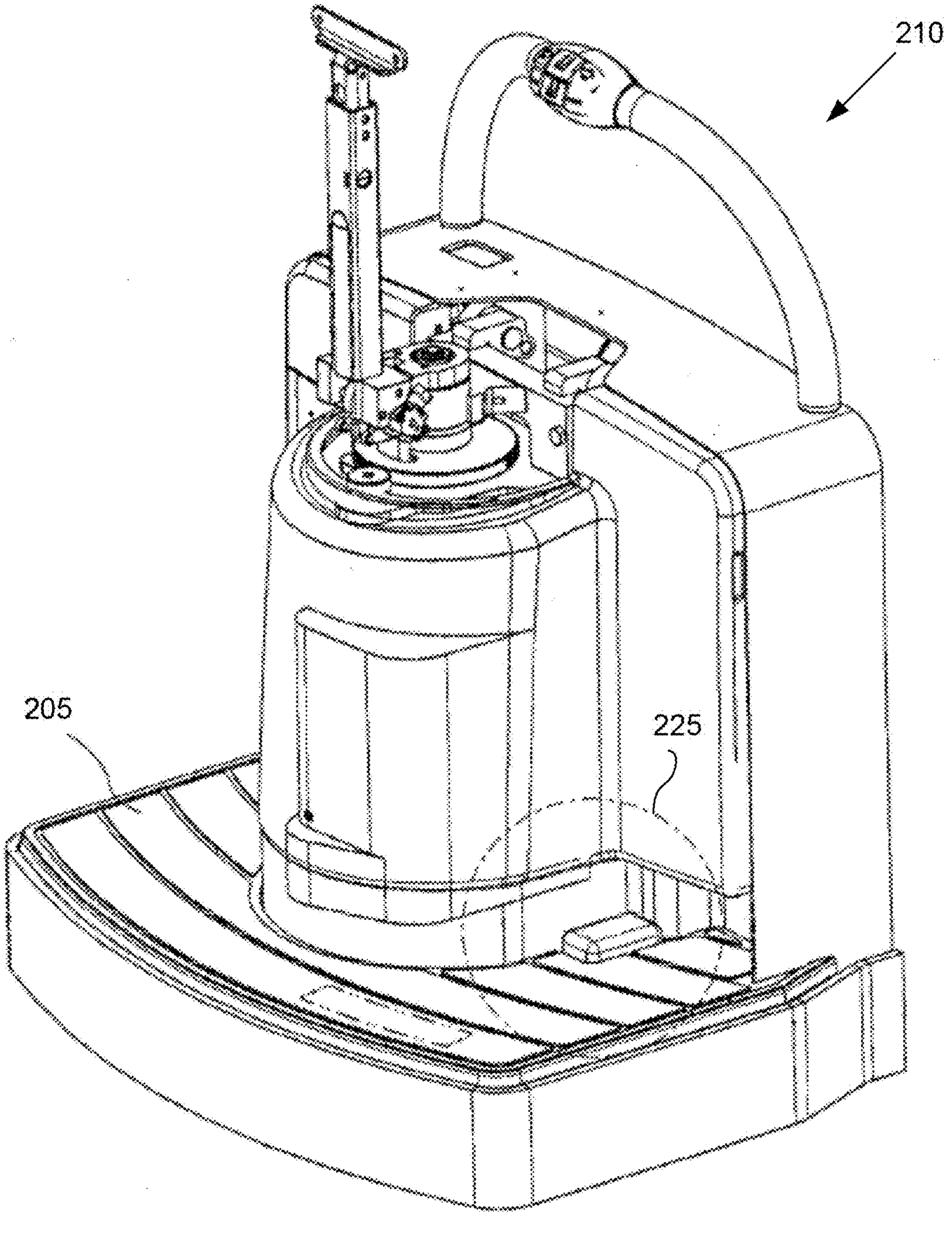
FIG. 6 illustrates a floor board or operator platform of a pallet truck with an enhanced traction control actuator.

Similar to a cruise control provided in a conventional automobile which may operate to relieve the driver's leg from having to press the gas pedal, control panel 12 may also be configured to provide cruise control functionality. However, unlike a car, certain types of industrial vehicles such as pallet trucks may be designed to function in limited modes of operation with or without the operator being present. Accordingly, the cruise control system associated with control panel 12 may be configured to monitor for the operator's presence, such as monitoring the continued input of one or more operator controls or depression of an actuator (such as enhanced traction control actuator 225 (FIG. 6).

The cruise control system may be activated by an initial actuation of high speed button 4, some other operator enabled control located on control panel 12, or depression of an actuator (such as enhanced traction control actuator 225). In some examples, after high speed button 4 has been activated and latched, reinitiating and holding high speed button 4 may turn on the cruise control system.

The operator may actuate the throttle 107, 137 to set or otherwise control the rate of acceleration or travel speed of the vehicle, and then actuate high speed button 4 to engage the cruise control. In some examples, the throttle 107, 137 and high speed button 4 may be concurrently actuated to engage cruise control. In other examples, the operator may release the throttle 107, 137 before pressing high speed button 4 to engage the cruise control. Continued depression of high speed button 4 may operate the vehicle in cruise control, such that the vehicle may continue to travel at the same speed which was last selected by throttle 107, 137. In some examples, the cruise control feature may be disabled if the operator releases the high speed button 4.

In some examples, when the vehicle is being operated in cruise control in the forks-trailing direction of vehicle travel, and the operator actuates throttle in a forks-leading direction of vehicle travel while concurrently pressing high speed button 4, the vehicle controller may be configured to disable the cruise control mode of operation and initiate regenerative braking. In some examples, cruise control may be disabled in the forks-leading direction of vehicle travel.

Providing cruise control via an operator control such as the high speed button 4 may operate to reduce the amount of operator fatigue and ergonomic challenges associated with holding a throttle for an extended period of time. Additionally, the functionality may be provided without requiring any additional operator controls. In some examples, cruise control may be provided on an industrial vehicle via software, using existing operator controls and/or hardware.

Figure 5:
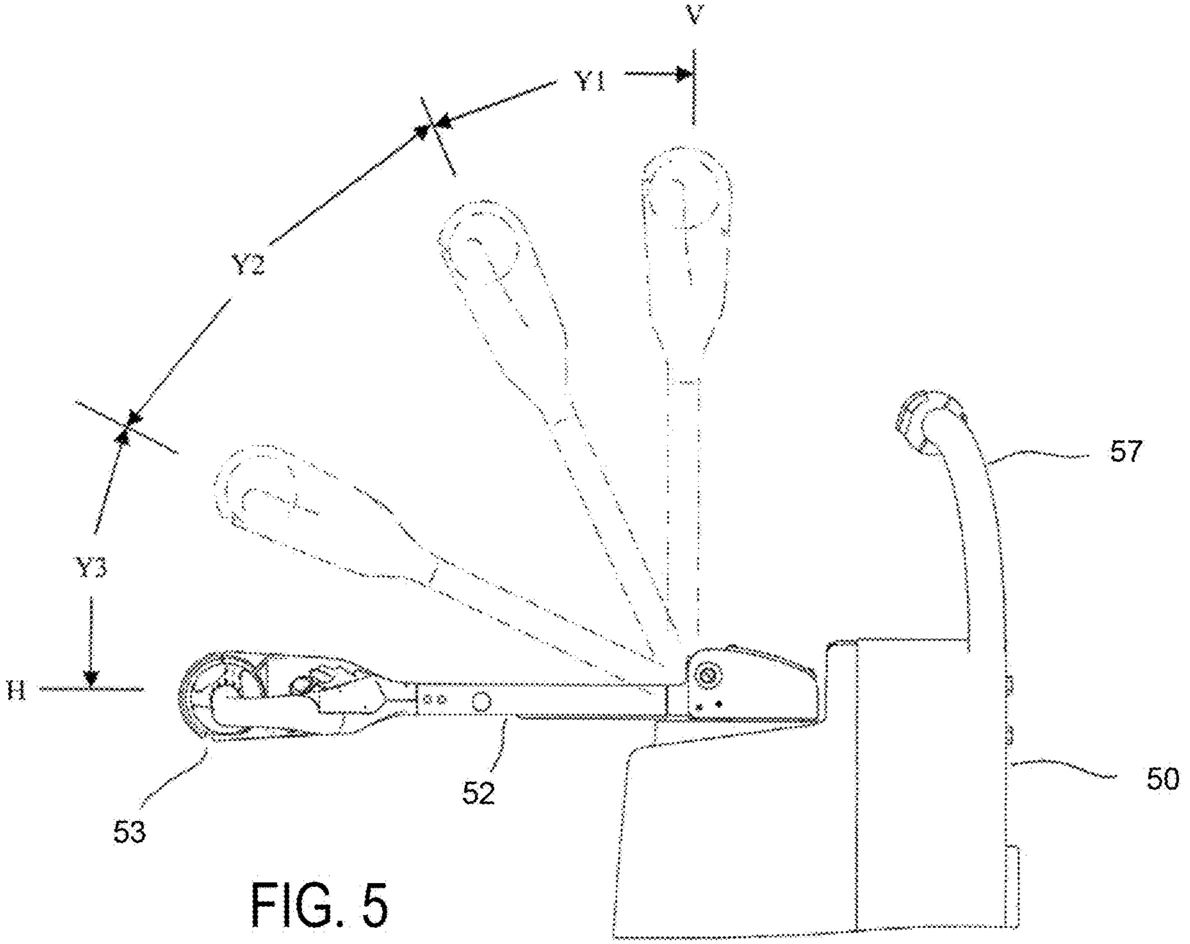
FIG. 5 illustrates a side view of an example control arm mounted to a pallet truck shown in partial view, depicting three different ranges of motion.

FIG. 5 illustrates a side view of an example control arm 52 mounted to a pallet truck 50 shown in partial view, depicting three different ranges of motion. In some examples, a "creep speed" function may be provided to over-ride the braking condition of the pallet truck 50 with the control handle 53 in a vertical position, and cause the pallet truck 52 to move in reduced, or creep, speed. By overriding the braking condition with the control arm in a vertical, or near vertical position, the pallet truck 50 may be made to maneuver in a narrow turning radius or avoid getting stuck. In some examples, the creep speed may be configured to reduce the maximum vehicle travel speed. In some examples, the creep speed function may enable a pallet truck to maneuver in small confines at a controlled low rate of travel, when the control handle 53 is located in an approximate vertical position V, for example, or in the pivot range Y1. Other examples may continue to provide for creep speed functionality when the steer arm is within the pivot range Y2.

The creep speed function may be disabled when the steer arm 52 is located in a horizontal position H or in the pivot range Y3, and instead the vehicle braking system may be configured to override the creep speed function and bring the pallet truck 50 to a controlled stop. Disabling the creep speed function in the pivot range Y3 may provide the operator with an immediate means of braking the pallet truck 50. With the steer arm 52 in the pivot range Y3, the turning radius of the pallet truck 50 may be increased as compared to the steer arm 52 being in a pivot range Y1.

A creep speed button may be included in the vicinity of the control handle 53, for example, which would engage a creep speed mode of the motor controller. The creep speed mode may be engaged upon a single press of the creep speed button, or alternatively be engaged only as long as the button is continually held in a pressed condition. Other types of switches, levers or controls may be used instead of the creep speed button, including being located on different parts of the steer arm 52 or on other locations of the pallet truck 50.

FIG. 6 illustrates a floor board or operator platform 205 of a pallet truck 210 with an enhanced traction control actuator 225. In some examples, actuator 225 may comprise a cruise control enable button mounted to the operator platform 205. The operator may enable the cruise control system by depressing actuator 225.

In some examples, actuator 225 may be configured to actuate the cruise control system but not actuate the traction motor when it is initially pressed. In some examples, pressing actuator 225 a second time may operate to either actuate the traction motor or deactivate the cruise control system.

Actuator 225 may be configured to simultaneously actuate the traction motor, and provide for subsequent actuation of the traction motor after the cruise control system has been activated. Pressing actuator 225 could alternate between activating and deactivating the cruise control system. In examples in which actuator 225 actuates the traction motor, then the traction motor may be actuated upon the first instance of actuator 225 being pressed, and each successive time actuator 225 is pressed.

In other examples, actuator 225 may be configured as an auxiliary mode shift actuator, which may be mounted to the operator platform such that the operator may enable the auxiliary mode of operation of the vehicle by depressing actuator 225 with the operator's foot. In some example modes of operation, actuator 225 may also, or alternatively, be configured to monitor the operator's presence. The vehicle controller may be configured to enable or disable one or more vehicle functions according to input received from actuator 225. For example, the vehicle controller may disable a cruise control mode of operation if actuator 225 is not being actuated or depressed.

Figure 7:
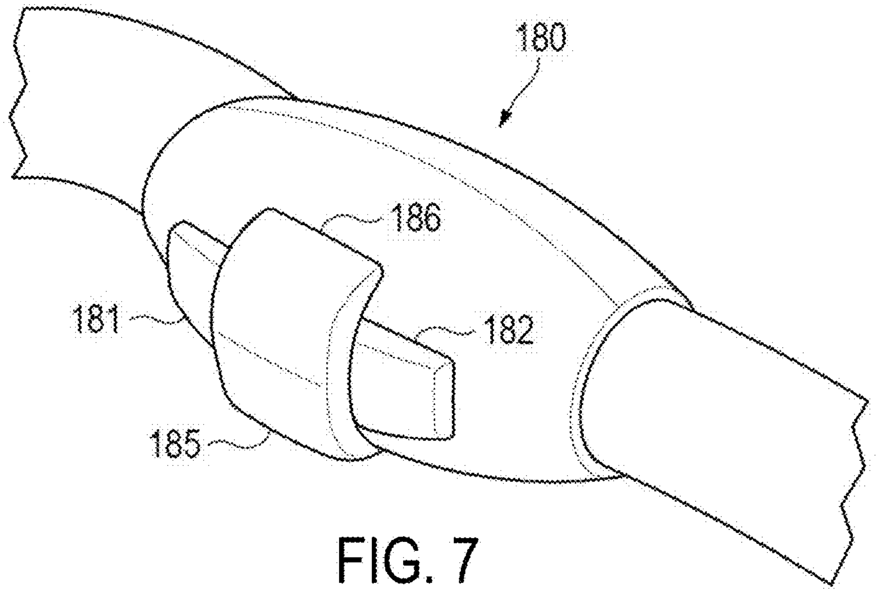
FIG. 7 illustrates another example control panel located on a support bar.

FIG. 7 illustrates another example control panel 180 located on a support bar. In some examples, control panel 180 may be configured as an auxiliary control assembly, providing some or all of the operations described above with respect to control handle 13 (FIG. 2) and/or control handle 130 (FIG. 3). For example, control panel 180 may comprise a lower actuator 185 and a lift actuator 186, similar to lower button 19 (FIG. 2) and lift button 18 (FIG. 2), respectively, of control handle 13. Additionally, control panel 180 may comprise one or more traction actuators, such as a first traction control 181 and a second traction control 182.

First traction control 181 may be associated with a walking speed, or slow rate of travel, whereas second traction control 182 may be associated with a transport speed, or fast rate of travel. In other examples, first traction control 181 may be associated with a forks-trailing, or forward direction of vehicle travel, whereas second traction control 182 may be associated with a forks-leading, or reverse direction of vehicle travel.

In some examples, first traction control 181 may limit the maximum travel speed of the vehicle to approximately four miles per hour. On the other hand, second traction control 182 may limit the maximum travel speed of the vehicle to approximately nine miles per hour, by way of example only. Control panel 180 may be configured to provide for cruise control, similar to one or more prior examples discussed above.

Figure 8:
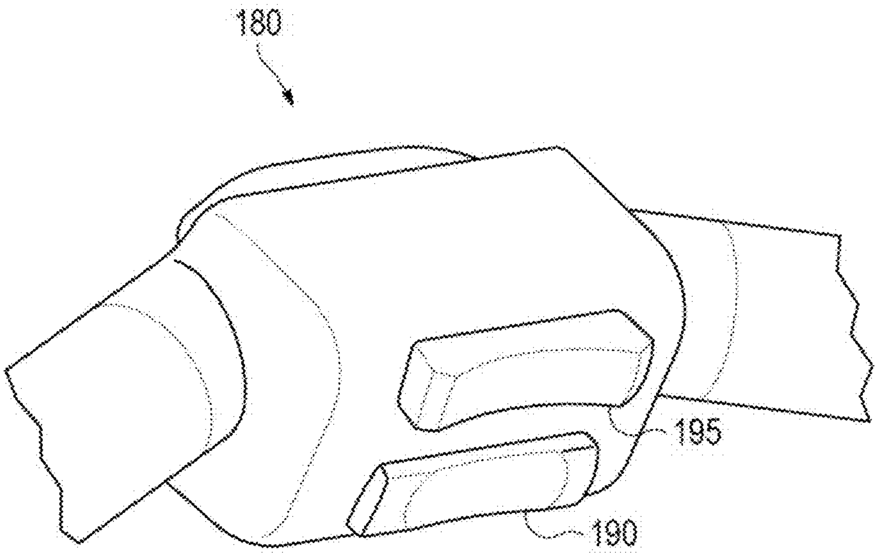
FIG. 8 illustrates a rear view of the example control bar of FIG. 7, including an enhanced traction control actuator.

FIG. 8 illustrates a rear view of the example control panel 180 of FIG. 7, including an auxiliary mode shift actuator 190. A separate actuation device 195 or button may also be provided on the back of the control bar. In some examples, actuation device 195 may comprise a horn or other type of alert. In still other examples, actuation device 195 may comprise a creep speed activation device, other types of vehicle function activations, or any combination thereof.

Auxiliary mode shift actuator 190 may be configured to provide additional operational features for an industrial vehicle, such as a pallet truck. For example, auxiliary mode shift actuator 190 may be configured to provide the operator with an ability to select the performance of the truck in a given application or usage scenario. Additionally, auxiliary mode shift actuator 190 may be configured to enable the operator to automate or semi-automate one or more functions of the vehicle, such as cruise control, to improve ergonomics and increase productivity.

In some examples, auxiliary mode shift actuator 190 may be configured to enable the operator to change or augment the functionality of other controls on control panel 180 and/or control panel 12 (FIG. 4). In still other examples, auxiliary mode shift actuator 190 may be configured to activate a vehicle cruise control system, or to reverse the direction of travel associated with an order picking operation.

Auxiliary mode shift actuator 190 may be communicatively coupled to a vehicle controller. The vehicle controller may receive a signal when auxiliary mode shift actuator 190 is activated, which may place the vehicle in an auxiliary mode of operation. In the auxiliary mode of operation, software associated with the vehicle controller may be configured to provide additional or augmented functionality to existing hardware on the truck that otherwise may be associated with a single or limited number of functions.

Auxiliary mode shift actuator 190 may be configured to operate similarly as a "shift" key or a "caps lock" key on a computer keyboard. In some examples, concurrent actuation of auxiliary mode shift actuator 190 and another control may result in an auxiliary mode of vehicle operation. In other examples, consecutive actuation of auxiliary mode shift actuator 190 followed by actuation of another control may result in the auxiliary mode of vehicle operation.

The vehicle controller may be configured to monitor the time between the consecutive actuations to ensure that the operator intended to engage the auxiliary mode of operation. For example, the vehicle controller may be configured to engage the auxiliary mode of operation if the consecutive actuation of the second control occurs within some predetermined time following actuation of auxiliary mode shift actuator 190, such as within one or two seconds.

In some examples, the location of auxiliary mode shift actuator 190 may enable simultaneous actuation of auxiliary mode shift actuator 190 and one or more of the controls illustrated in FIG. 7 with a single hand of the operator. For example, the operator's thumb may be used to press or otherwise actuate second traction control 182 while the operator's forefinger presses or otherwise actuates auxiliary mode shift actuator 190.

Other than physical location, one or more of the operator controls illustrated in FIGS. 1-11 may be interchangeably configured to provide the same or similar functionality as any of the examples described above, irrespective of which particular operator control is being referenced in the particular example provided.

An operator control may similarly be located on other components or locations of the vehicle and achieve similar results as one or more of the examples described herein. In some examples, an auxiliary mode shift actuator may be provided on a wireless control device, a handheld device, or a wearable that the operator may use to remotely operate the vehicle according to some or all of the examples provided herein Actuation of auxiliary mode shift actuator 190 may be configured to place the vehicle in an auxiliary mode of operation. In the auxiliary mode of operation, such as cruise control, the vehicle controller may be configured to automatically raise the forks to the maximum lift height when the vehicle traction motor is engaged. Raising the forks to the maximum lift height may place less strain on the lifting linkage and result in less wear during movement of the vehicle, particularly when travelling over uneven or irregular surfaces.

Instead of utilizing a separate auxiliary mode shift actuator 190 to place the vehicle in the auxiliary mode of operation, the operator may press or otherwise select an operator control twice in succession, similar to a "double-click" on a computer mouse. In order to filter inadvertent selection of the auxiliary mode of operation, the vehicle controller may monitor for successive actuations of the operator control within a predetermined time period, such as within one second. In still other examples, the vehicle controller may be configured to place the vehicle in the auxiliary mode of operation if the operator control is continuously actuated (e.g., held down) for a predetermined time period.

In some examples, actuation of auxiliary mode shift actuator 190 may be configured to place the vehicle in an auxiliary mode of operation, which allows the vehicle to be placed in a second mode of increased acceleration. For example, the vehicle controller may be configured to increase the acceleration rate and/or increase the maximum rate of travel associated with the vehicle while traveling in the forks-trailing direction during cruise control, and limit the vehicle to a reduced rate of vehicle travel when the vehicle is operating in cruise control in the forks-leading direction.

In some examples, the vehicle may comprise a load sensor. The load sensor may be configured to determine whether there is a pallet on the forks and/or to determine how much weight is being carried by the forks. In one or more examples, a load sensor or some other type of device may be configured to determine that the pallet has been fully engaged by the forks, the pallet is properly positioned on the forks, the pallet truck is not overloaded, the load is approximately evenly distributed on the forks, other lifting and/or transport criteria have been met, or any combination thereof. Based on the input from the load sensor, the vehicle controller may be configured to automatically enable, disable, or modify an auxiliary mode of operation, such as cruise control.

In some examples, the vehicle controller may be configured to deactivate the auxiliary mode of operation upon receiving or otherwise detecting one or more of the following: a second or subsequent actuation of the auxiliary mode actuator, two or more sequential actuations of one of the vehicle controls, prolonged actuation of an operator control, a braking command, an acceleration request, a steering request, other types of events and/or signals, or any combination thereof.

Figure 9:
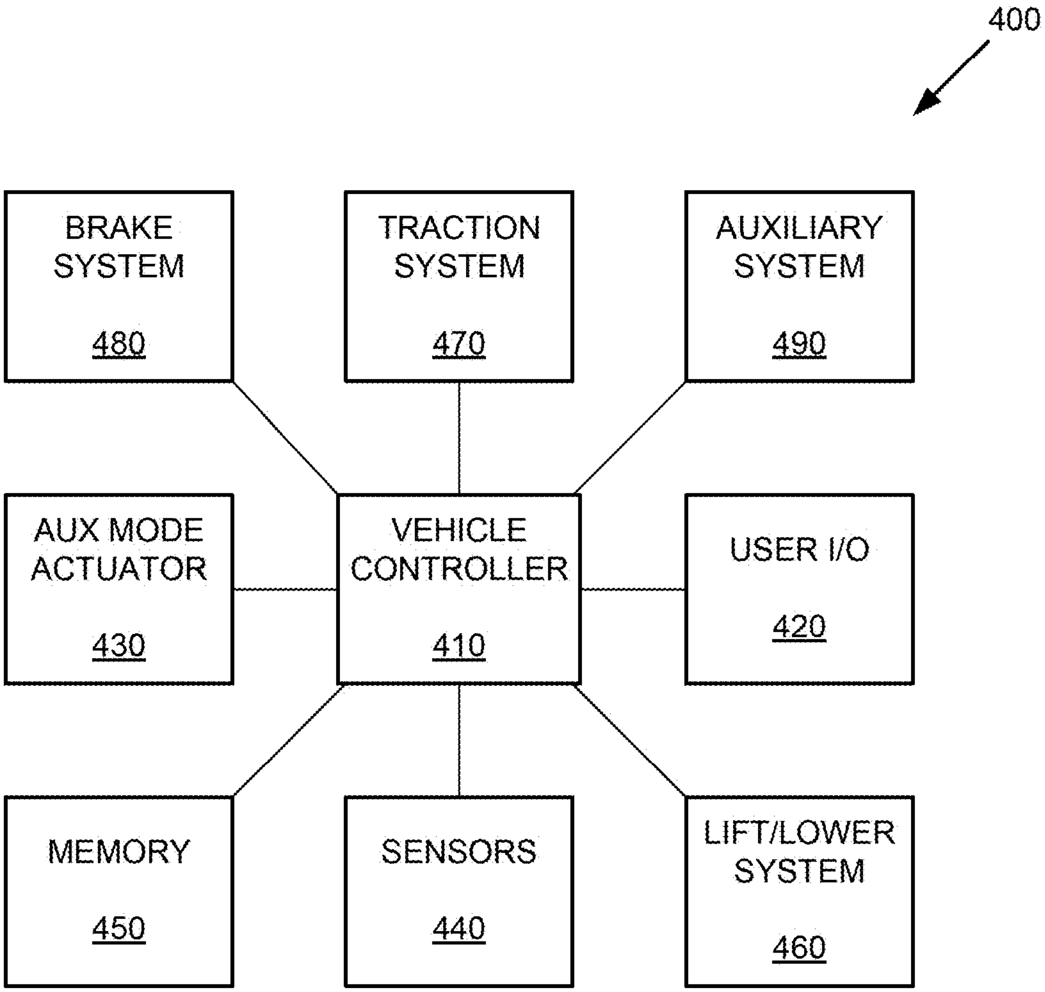
FIG. 9 illustrates a block diagram of a system for providing enhanced traction control.

FIG. 9 illustrates a block diagram of a system 400 for providing enhanced traction control. Control system 400 may comprise a vehicle controller 410 communicatively coupled to an operator controlled input/output device 420 and an auxiliary mode actuator 430.

The input/output device 420 may be configured to actuate a vehicle system in a first mode of operation. In some examples, the vehicle system may comprise a lift/lower system 460, a traction system 470, a braking system 480, and/or other types of auxiliary systems 490 such as systems configured to perform load handling functions such as center, tilt, rotate, and spread, or any combination thereof.

Input/output device 420 may be configured to transmit a control signal to vehicle controller 410. In some examples, the control signal may be sent continuously, or repeatedly, throughout the duration of the first mode of operation. Additionally, the vehicle system may be deactivated or otherwise cease to be actuated in the first mode of operation after the control signal is no longer transmitted by the input/output device 420.

Input/output device 420 may comprise an operator controlled input device configured to selectively affect a speed of the pallet truck in both a forward direction of vehicle travel and a reverse direction of vehicle travel. In some examples, the operator controlled input device may comprise a primary throttle that is configured to affect a speed of the pallet truck in a standard mode of operation. In particular, the pallet truck may accelerate, decelerate, maintain a certain speed, or some combination thereof, based on actuation of the primary throttle.

Auxiliary mode actuator 430 may be configured to transmit an auxiliary signal to vehicle controller 410. In some examples, the auxiliary mode signal may be transmitted to vehicle controller 410 at the same time that the control signal is being transmitted by input/output device. In other examples, the auxiliary mode signal may be transmitted to vehicle controller 410 before or after the control signal is transmitted. Vehicle controller 410 may be configured to actuate the vehicle system in a second, or auxiliary, mode of operation in response to receiving both the control signal and the auxiliary signal.

Auxiliary mode actuator 430 may comprise an operator controlled actuation device configured to place a pallet truck in an auxiliary mode of operation. In some examples, auxiliary mode actuator 430 may comprise a secondary throttle that is configured to accelerate the pallet truck in both the forward direction of vehicle travel and the reverse direction of vehicle travel in the auxiliary mode of operation. In some examples, the auxiliary mode of operation may comprise a pick mode of the pallet truck.

Both the primary throttle of input/output device 420 and the secondary throttle of auxiliary mode actuator 430 may be located on a steering control handle of the pallet truck. The secondary throttle may comprise a rocker switch including a first portion configured to accelerate the pallet truck in the forward direction of vehicle travel and a second portion configured to accelerate the pallet truck in the reverse direction of vehicle travel. Additionally, the rocker switch may be configured to provide variable rates of acceleration of the vehicle corresponding to an amount of rotation of the rocker switch while the pallet truck is in the auxiliary mode of operation.

The vehicle controller 410 may be configured to actuate the vehicle system in the auxiliary mode of operation in response to receiving a concurrent transmission of both the control signal and the auxiliary signal. In other examples, the vehicle controller 410 may be configured to actuate the vehicle system in the auxiliary mode of operation in response to receiving the control signal within a predetermined time period after receiving the auxiliary signal. The predetermined period of time may be less than approximately one second, by way of non-exhaustive example. The vehicle controller 410 may be communicatively coupled to both input/output device 420 and auxiliary mode actuator 430.

The industrial vehicle may comprise an operator platform configured to support an operator, and the vehicle system may continue to be actuated in the auxiliary mode of operation after the operator has left the operator platform. The auxiliary mode actuator 430 may comprise a switch or sensor located on the operator platform (such as enhanced traction control actuator 225 (FIG. 6), and the switch may be configured to detect the presence of the operator. In some examples, the vehicle controller 410 may deactivate the auxiliary mode of operation when the operator presence is not detected.

Additionally, the industrial vehicle may comprise a grab bar or control bar. The grab bar may be mounted to the vehicle frame. In some examples, the auxiliary mode actuator 430 may be located on the grab bar. One or more input devices may also be located on the grab bar. In some examples, input/output device 420 may be located on a steering control handle of the pallet truck.

Certain types of industrial vehicles, such as a pallet truck, may comprise a steering control arm. The steering control arm may be configured to steer, brake, and/or command the vehicle to perform additional functions. The input/output device 420 may be located on an end of the steering control arm, and both the auxiliary mode actuator 430 and the input/output device 420 may be accessible by the operator for concurrent actuation. In some examples, both the auxiliary mode actuator 430 and the input/output device 420 may be actuated concurrently by the same hand of the operator.

The steering control arm may be configured to be operated by an operator walking next to the industrial vehicle, and both the input/output device 420 and the auxiliary mode actuator 430 may be located on an end of the steering control arm. In some examples, the vehicle system may continue to be actuated in the auxiliary mode of operation after the operator has released the steering control arm. For example, the steering control arm may be released by the operator and automatically return to an upright position.

Control system 400 may further comprise one or more sensors 440, including a sensor configured to detect the presence of a pallet. Vehicle controller 410 may be configured to actuate the vehicle system in the auxiliary mode of operation in response to receiving both the control signal and the auxiliary signal provided that the presence of the pallet is detected by the sensor. In some examples, vehicle controller 410 may be configured to actuate the traction system 470 in the auxiliary mode of operation in response to receiving both the control signal and the auxiliary signal provided that the presence of the pallet is detected by a sensor or switch.

Traction system 470 may comprise a motor, an engine, a transmission, a drive train, a number of wheels, tracks, other types of tractive devices, or any combination thereof. Traction system 470 may be configured to move the industrial vehicle in a forward or backwards direction, according to the commanded action via input/output device 420 or as otherwise instructed by vehicle controller 410. During the first mode of operation, the traction system 470 may be configured to move the industrial vehicle according to a first rate of travel. During the auxiliary mode of operation, the traction system 470 may be configured to move the industrial vehicle according to a second rate of travel.

Vehicle controller 410 may be configured to monitor a speed of the pallet truck. The speed may comprise an operator-selectable intermediate rate of travel less than a maximum rate of vehicle travel associated with the auxiliary mode of operation. Additionally, vehicle controller may be configured to command the traction motor to maintain the speed of the pallet truck at the intermediate rate of travel without actuation of the operator controlled input device in response to receiving an actuation signal from auxiliary mode actuator 430 to place the pallet truck in the auxiliary mode of operation.

Auxiliary mode actuator 430 may comprise a high-speed actuation device configured to enable a high-speed mode of operation of vehicle travel, and input-output device 420 may comprise a primary throttle that is configured to accelerate, decelerate, or maintain a speed of the pallet truck at an operator-selectable intermediate rate of high-speed travel within the high-speed mode of operation. The vehicle controller 410 may be configured to command the traction system 470 to maintain the speed of the pallet truck at the intermediate rate of high-speed travel after the primary throttle is released.

In some examples, vehicle controller 410 may be configured to receive a first actuation signal from a secondary throttle of auxiliary mode actuator 430 and, in response to receiving the first actuation signal, command the traction system 470 to maintain the speed of the pallet truck at the intermediate rate of travel in the forward direction of vehicle travel.

Still further, vehicle controller 410 may be configured to receive a third actuation signal from the secondary throttle of auxiliary mode actuator 430 and, in response to receiving the third actuation signal, command the traction system 470 to maintain the speed of the pallet truck at the intermediate rate of travel in the reverse direction of vehicle travel.

The reverse direction of vehicle travel may be associated with a forks-leading direction of vehicle travel, and the auxiliary mode of operation may comprise cruise control. In some examples, the cruise control may be disabled in the forks-leading direction of vehicle travel.

Figure 10:
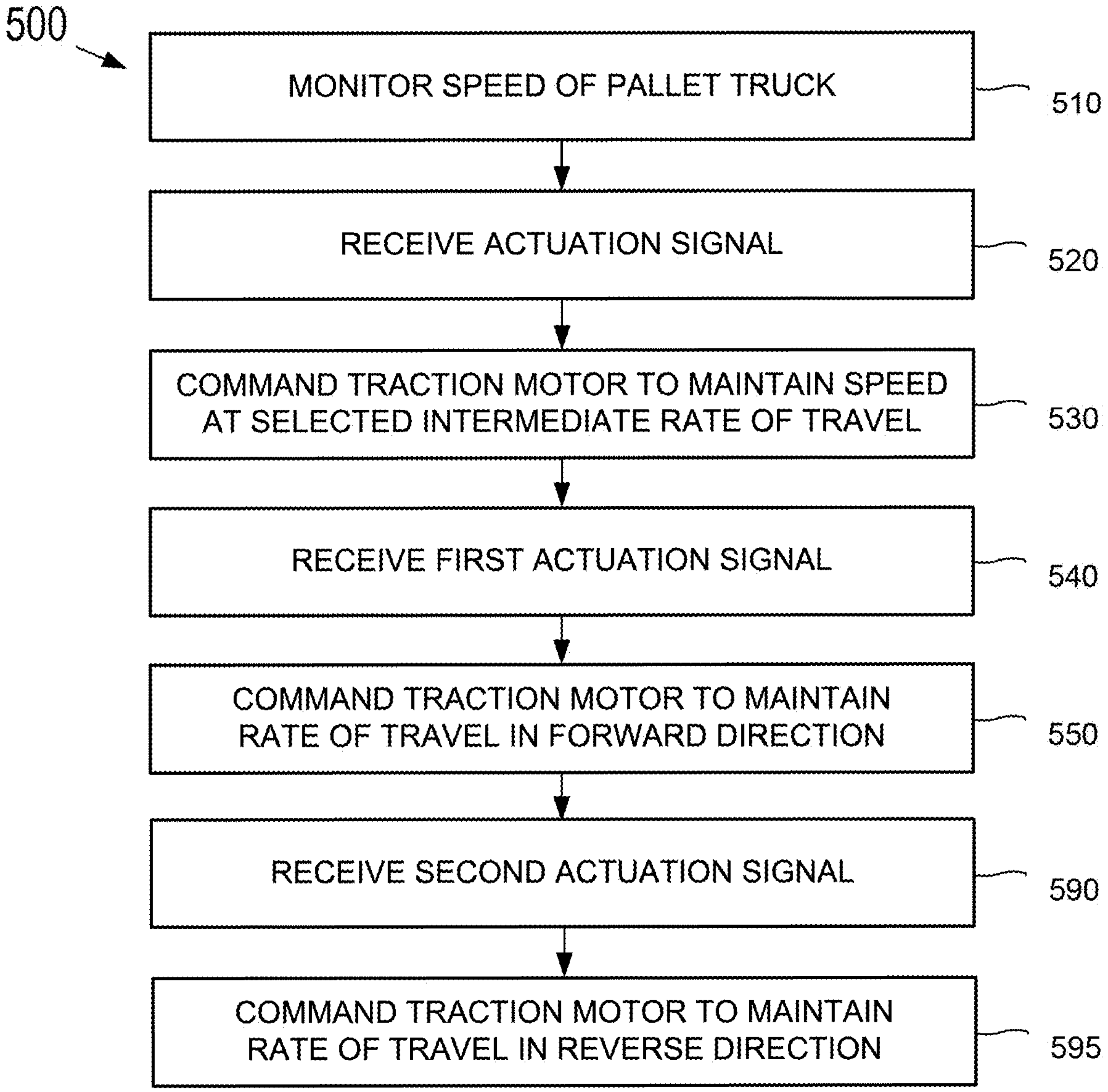
FIG. 10 illustrates an example process for providing enhanced traction control.

FIG. 10 illustrates an example process 500 for providing enhanced traction control. Process 500 may comprise a method of operating a traction control system including a traction motor, an operator controlled input device configured to selectively affect a speed of the pallet truck in both a forward direction of vehicle travel and a reverse direction of vehicle travel, and an operator controlled actuation device configured to place the pallet truck in an auxiliary mode of operation.

At operation 510, a vehicle controller may monitor a speed of the pallet truck. The speed may comprise an operator-selectable intermediate rate of travel less than a maximum rate of vehicle travel associated with the auxiliary mode of operation.

At operation 520, the vehicle controller may receive an actuation signal from the actuation device to place the pallet truck in the auxiliary mode of operation.

At operation 530, the vehicle controller may command the traction motor to maintain the speed of the pallet truck at the intermediate rate of travel in response to receiving the actuation signal. Additionally, the traction motor may be configured to maintain the speed of the pallet truck without actuation of the operator controlled input device.

In some examples, the operator controlled input device may comprise a primary throttle that is configured to affect a speed of travel of the pallet truck in a standard mode of operation, and the operator controlled actuation device may comprise a secondary throttle that is configured to affect a speed of travel of the pallet truck in both the forward direction of vehicle travel and the reverse direction of vehicle travel in the auxiliary mode of operation.

Both the primary throttle and the secondary throttle may be located on a steering control handle of the pallet truck, and the auxiliary mode of operation may comprise a pick mode of the pallet truck.

In some examples, the secondary throttle may comprise a rocker switch including a first portion configured to accelerate the pallet truck in the forward direction of vehicle travel and a second portion configured to accelerate the pallet truck in the reverse direction of vehicle travel. The rocker switch may be configured to provide variable rates of acceleration of the vehicle corresponding to an amount of rotation of the rocker switch while the pallet truck is in the auxiliary mode of operation.

In other examples, the operator controlled input device may be located on a steering control handle of the pallet truck, and the operator controlled actuation device may be located on a grab-bar of the pallet truck. The operator controlled actuation device may comprise a high speed actuation device configured to enable a high speed mode of operation of vehicle travel, and the operator controlled input device may comprise a primary throttle that is configured to affect a speed of the pallet truck at an operator-selectable intermediate rate of high speed travel within the high speed mode of operation. The vehicle controller may command the traction motor to maintain the speed of the pallet truck at the intermediate rate of high-speed travel after the primary throttle is released.

At operation 540, the vehicle controller may receive a first actuation signal from the secondary throttle.

At operation 550, the vehicle controller may command the traction motor to maintain the speed of the pallet truck at the intermediate rate of travel in the forward direction of vehicle travel in response to receiving the first actuation signal.

At operation 590, the vehicle controller may receive a second actuation signal from the secondary throttle.

At operation 595, the vehicle controller may command the traction motor to maintain the speed of the pallet truck at the intermediate rate of travel in the reverse direction of vehicle travel in response to receiving the second actuation signal.

The reverse direction of vehicle travel may comprise a forks-leading direction of vehicle travel, and the auxiliary mode of operation may comprise cruise control. In some examples, the vehicle controller may be disable the cruise control in the forks-leading direction of vehicle travel.

Additionally, the vehicle controller may receive a deactivation signal. The deactivation signal may be sent as a result of an operator initiated command. In other examples, the deactivation signal may comprise a sensor signal. In other examples, the deactivation signal may be generated as a result of the lapse of a predetermined period of time. In still other examples, the deactivation signal may correspond with the absence of any input or control signals.

The vehicle controller may be configured to deactivate the auxiliary mode of operation in response to receiving the deactivation signal. In other examples, the vehicle controller may be configured to automatically deactivate the auxiliary mode of operation at the conclusion of a load handling procedure or at the conclusion of a vehicle operation.

The systems and apparatuses described above may use dedicated processor systems, micro controllers, programmable logic devices, or microprocessors that perform some or all of the operations. Some or all of the operations described above may be implemented in software, hardware or a combination of both.

Additionally, while some of the examples have been illustrated or described with respect to providing functionality for a "walkie" or "rider" style pallet truck, some or all of the features may also be enabled for operation with other types of industrial vehicles including, but not limited to, reach trucks, three-wheel stand trucks, warehouse trucks, and counterbalanced trucks.

Having described and illustrated various examples herein, it should be apparent that other examples may be modified in arrangement and detail. We claim all modifications and variations coming within the spirit and scope of the following claims.

The invention claimed is:

1. A traction control system for a pallet truck, comprising:
- a traction motor;
- an operator controlled throttle configured to receive an operator input to selectively select a speed of the pallet truck in both a forward direction of vehicle travel and a reverse direction of vehicle travel; and
- an operator controlled actuation device configured to place the pallet truck in an auxiliary mode of operation, wherein:
  - the selected speed of the pallet truck is maintained at a constant rate of travel, via the traction motor, when the pallet truck is in the auxiliary mode of operation and the throttle no longer receives the operator input.

2. The traction control system of claim 1, wherein the operator controlled actuation device includes a cruise control device configured to lock a position of the operator controlled throttle when in the auxiliary mode of operation, wherein the speed of the pallet truck is maintained based on the operator controlled throttle being locked in the position.

3. The traction control system of claim 2, wherein the cruise control device is configured to lock the position of the operator controlled throttle input device when the operator input is associated with the forward direction of vehicle travel, and wherein the cruise control device is disabled when the operator input is associated with the reverse direction of vehicle travel.

4. The traction control system of claim 1, further comprising a vehicle controller communicatively coupled to the operator controlled throttle, the operator controlled actuation device, and the traction motor, wherein the vehicle controller is configured to:
- monitor the speed of the pallet truck;
- receive an actuation signal from the operator controlled actuation device;
- in response to receiving the actuation signal, cause the pallet truck to transition to the auxiliary mode of operation; and
- command the traction motor to maintain the speed of the pallet truck while the pallet truck is in the auxiliary mode of operation.

5. The traction control system of claim 4, wherein the vehicle controller is further configured to:
- determine whether the pallet truck is travelling in a the forward direction of vehicle travel or the reverse direction of vehicle travel while the speed of the pallet truck is being maintained;
- detect actuation of the operator controlled throttle, wherein the detected actuation is associated with the reverse direction of vehicle travel; and
- in response to detection of the actuation of the operator controlled throttle associated with the reverse direction of vehicle travel, cause the pallet truck to disable the auxiliary mode of operation.

6. The traction control system of claim 4, wherein the vehicle controller is further configured to:
- receive a subsequent actuation signal from the operator controlled throttle; and
- in response to receiving the subsequent actuation signal, cause the pallet truck to disable the auxiliary mode of operation.

7. The traction control system of claim 4, further comprising an operator detection system communicatively coupled to the vehicle controller, the operator detection system configured to detect a presence of an operator on the pallet truck, wherein the vehicle controller is further configured to cause the pallet truck to disable the auxiliary mode of operation based on detection of an absence of the operator from the pallet truck via the operator detection system.

8. The traction control system of claim 7, wherein the operator detection system includes an actuator located on an operator platform, and wherein the operator detection system is configured to detect the absence of the operator from the pallet truck based on a lack of depression of the actuator.

9. The traction control system of claim 4, further comprising a sensor communicatively coupled to the vehicle controller, wherein the sensor is configured to:

detect characteristics associated with a pallet located on forks of the pallet truck; and determine transport criteria based on the characteristics, wherein the vehicle controller is further configured to cause the pallet truck to disable the auxiliary mode of operation based on the transport criteria.

10. The traction control system of claim 4, wherein the vehicle controller is further configured to, in response to receiving the actuation signal, cause the pallet truck to raise the forks of the pallet truck to a maximum lift height.

11. The traction control system of claim 4, wherein the actuation signal is a second actuation signal, and wherein the vehicle controller is further configured to:

receive a first actuation signal from the operator controlled actuation device, the first actuation signal received prior to the second actuation signal; and determine that a time period between reception of the first actuation signal and reception of the second actuation signal is less than a threshold time period, wherein vehicle controller is configured to command the traction motor to maintain the speed of the pallet truck based on the time period being less than the threshold time period.

12. The traction control system of claim 1, further comprising a vehicle controller configured to:

monitor an initial speed of the pallet truck;

receive an actuation signal from the operator controlled actuation device;

in response to receiving the actuation signal, cause the pallet truck to transition to the auxiliary mode of operation;

determine that the pallet truck is travelling in the reverse direction of vehicle travel when the actuation signal is received;

determine that the initial speed of the pallet truck is greater than a maximum speed for the auxiliary mode of operation in the reverse direction of vehicle travel; and command the traction motor to adjust a rate of travel of the pallet truck to the maximum speed for the auxiliary mode of operation in the reverse direction of the vehicle travel and maintain the rate of travel of the pallet truck at the maximum speed for the auxiliary mode of operation in the reverse direction of vehicle travel while the pallet truck is in the auxiliary mode of operation.

13. A method of operating a traction control system of a pallet truck, the traction control system including a traction motor, an operator controlled throttle configured to selectively select a speed of the pallet truck in both a forward direction of vehicle travel and a reverse direction of vehicle travel, and an operator controlled actuation device configured to place the pallet truck in an auxiliary mode of operation, the method comprising:

selecting, via a vehicle controller, the speed of the pallet truck based on input received from the throttle;

receiving, via the vehicle controller, an actuation signal from the operator controlled actuation device;

causing, via the vehicle controller, the pallet truck to transition to the auxiliary mode of operation in response to receiving the actuation signal; and commanding, via the vehicle controller, the traction motor to at least maintain the pallet truck at or above the selected speed while in the auxiliary mode of operation and without receiving an input from the throttle.

14. The method of claim 13, further comprising:

determining, via the vehicle controller, that the pallet truck is travelling in a first direction of vehicle travel while the speed of the pallet truck is being maintained;

detecting, via the vehicle controller, actuation of an operator controlled input device, the actuation associated with the reverse direction of vehicle travel; and causing, via the vehicle controller, the pallet truck to disable the auxiliary mode of operation in response to detecting the actuation of the operator controlled input device associated with the reverse direction of vehicle travel.

15. The method of claim 13, further comprising:

receiving, via the vehicle controller, a subsequent actuation signal from the operator controlled actuation device; and causing, via the vehicle controller, the pallet truck to disable the auxiliary mode of operation in response to receiving the subsequent actuation signal.

16. The method of claim 13, further comprising:

receiving, via the vehicle controller, an indication of an absence of an operator from the pallet truck from an operator detection system; and causing, via the vehicle controller, the pallet truck to disable the auxiliary mode of operation based on the indication of the absence of an operator from the pallet truck.

17. The method of claim 16, wherein the operator detection system includes an actuator located on an operator platform of the pallet truck, and wherein the indication is transmitted via the operator detection system based on a lack of depression of the actuator.

18. The method of claim 13, further comprising:

receiving, via the vehicle controller, transport criteria from a sensor, the sensor to determine the transport criteria based on characteristics associated with a pallet located on forks of the pallet truck; and causing, via the vehicle controller, the pallet truck to disable the auxiliary mode of operation based on the transport criteria.

19. The method of claim 13, further comprising causing, via the vehicle controller, the pallet truck to raise the forks of the pallet truck to a maximum lift height in response to receiving the actuation signal.

20. The method of claim 13, wherein the actuation signal is a second actuation signal, and wherein the method further comprises:

receiving, via the vehicle controller, a first actuation signal from the operator controlled actuation device, the first actuation signal received prior to the second actuation signal; and determining, via the vehicle controller, that a time period between reception of the first actuation signal and reception of the second actuation signal is less than a threshold time period, wherein commanding the traction motor to maintain the speed is based on the time period being less than the threshold time period.

21. A traction control system for a pallet truck, comprising:

a traction motor;

an operator controlled input device configured to selectively affect a speed of the pallet truck in both a forward direction of vehicle travel and a reverse direction of vehicle travel;

an operator controlled actuation device configured to place the pallet truck in an auxiliary mode of operation, wherein the speed of the pallet truck is maintained, via the traction motor, when the pallet truck is in the auxiliary mode of operation; and a vehicle controller adapted to:

monitor an initial speed of the pallet truck;

receive an actuation signal from the operator controlled actuation device;

cause, in response to receiving the actuation signal, the pallet truck to transition to the auxiliary mode of operation;

determine that the pallet truck is travelling in the reverse direction of vehicle travel when the actuation signal is received;

determine that the initial speed of the pallet truck is greater than a maximum speed for the auxiliary mode of operation in the reverse direction of vehicle travel; and command the traction motor to adjust a rate of travel of the pallet truck to the maximum speed for the auxiliary mode of operation in the reverse direction of the vehicle travel and maintain the rate of travel at the pallet truck at the maximum speed for the auxiliary mode of operation in the reverse direction of vehicle travel while the pallet truck is in the auxiliary mode of operation.

22. A non-transitory computer-readable medium comprising instructions that, when executed by a controller of a pallet truck, cause the controller to:

monitor an initial speed of the pallet truck;

receive an actuation signal from an operator controlled actuation device;

cause, in response to receiving the actuation signal, the pallet truck to transition to an auxiliary mode of operation;

determine that the pallet truck is travelling in a reverse direction of vehicle travel when the actuation signal is received;

determine that the initial speed of the pallet truck is greater than a maximum speed for the auxiliary mode of operation in the reverse direction of vehicle travel; and command the pallet truck to adjust its rate of travel to the maximum speed for the auxiliary mode of operation in the reverse direction of the vehicle travel and maintain the rate of travel at the maximum speed for the auxiliary mode of operation in the reverse direction of vehicle travel while the pallet truck is in the auxiliary mode of operation.

* * * * *